(12) United States Patent
Segato

(10) Patent No.: US 8,308,234 B2
(45) Date of Patent: Nov. 13, 2012

(54) SEATING STRUCTURE MADE OF NATURAL COMPOSITE MATERIAL AND PROCESS FOR MAKING SAME

(75) Inventor: Stefano Segato, Vicenza (IT)

(73) Assignee: Brooks England Limited, Birmingham (GB)

( * ) Notice: Subject to any disclaimer, the term of this patent is extended or adjusted under 35 U.S.C. 154(b) by 414 days.

(21) Appl. No.: 12/527,229

(22) PCT Filed: Feb. 14, 2008

(86) PCT No.: PCT/IB2008/050539
§ 371 (c)(1),
(2), (4) Date: Aug. 14, 2009

(87) PCT Pub. No.: WO2008/099364
PCT Pub. Date: Aug. 21, 2008

(65) Prior Publication Data
US 2010/0013278 A1  Jan. 21, 2010

(30) Foreign Application Priority Data
Feb. 16, 2007  (IT) .............................. VI2007A0042

(51) Int. Cl.
*B62J 1/00* (2006.01)

(52) U.S. Cl. ................ 297/215.16; 297/195.1

(58) Field of Classification Search ............... 297/195.1, 297/202, 215.16, 452.57
See application file for complete search history.

(56) References Cited

U.S. PATENT DOCUMENTS

| | | | | |
|---|---|---|---|---|
| 4,098,537 A * | 7/1978 | Jacobs | ...................... | 297/215.16 |
| 5,356,205 A * | 10/1994 | Calvert et al. | ............. | 297/452.41 |
| 5,766,704 A * | 6/1998 | Allen et al. | .................. | 428/34.1 |
| 6,116,684 A * | 9/2000 | Williams | ....................... | 297/214 |
| 6,409,865 B1* | 6/2002 | Yates | ............................ | 156/214 |
| 6,860,552 B1* | 3/2005 | Bigolin | ......................... | 297/214 |
| 6,957,857 B1* | 10/2005 | Lee | .......................... | 297/215.16 |
| 6,976,736 B2* | 12/2005 | Yu | ............................ | 297/215.16 |
| 7,341,308 B2* | 3/2008 | Milton | ......................... | 297/202 |
| 7,547,064 B2* | 6/2009 | Garneau | .................... | 297/195.1 |
| 2003/0087973 A1 | 5/2003 | Muzzy | | |
| 2004/0090096 A1 | 5/2004 | Bigolin et al. | | |
| 2005/0121951 A1 | 6/2005 | Yu | | |

FOREIGN PATENT DOCUMENTS

DE  19806703 A1  11/1999

* cited by examiner

*Primary Examiner* — Sarah B McPartlin
(74) *Attorney, Agent, or Firm* — Tutunjian & Bitetto, P.C.

(57) ABSTRACT

A seating structure, particularly a bicycle saddle, includes a load-bearing shell and a cover element for contact with a user. The shell includes a first base element made from a composite material composed of a synthetic polymeric matrix and a natural fiber-containing reinforcement. The shell may have one or more differential deformable portions. A process for making such a seating structure is also disclosed.

18 Claims, 4 Drawing Sheets

SEATING STRUCTURE MADE OF NATURAL COMPOSITE MATERIAL AND PROCESS FOR MAKING SAME

TECHNICAL FIELD

The present invention is applicable to the art of sport and leisure accessories and particularly relates to a seating structure made of natural composite material, and a process for making same.

BACKGROUND ART

Bicycle saddles and the like are known to comprise a shell having an underside designed to face towards a bicycle frame and a topside designed to face towards a seated user. Comfort elements of the saddle, such as inserts of elastomer, foam or gel and/or cover elements for contact with the seated user are generally attached to the top of the shell.

Bicycle saddle shells are generally formed of a polymeric material such as polypropylene, polyamide, polybutadiene terephthalate or the like. While such polymeric material provides the advantages of having a light weight and a low cost, it exhibits no particularly high mechanical performances.

In view of obviating this drawback, while maintaining the light weight of the saddle, synthetic composite materials have been increasingly used, which are known to comprise a polymeric matrix with a filler including fiberglass, carbon, kevlar® or the like dispersed therein. A few examples of these prior art saddles are disclosed in WO2006046110, WO2006085202, EP-B1-1305203 by the same Applicant.

One drawback of these known solutions is that the synthetic fibers of the composite material are not easily recyclable, which causes the saddle to have a relatively high environmental impact.

SUMMARY

The object of the present invention is to overcome the above drawbacks, by providing a seating structure that is highly efficient and relatively cost-effective.

A particular object is to provide a seating structure that has a relatively low environmental impact.

A further object of the invention is to provide a seat making process that has a relatively low environmental impact.

These and other objects, as more clearly explained hereinafter, are fulfilled by a seating structure comprising a load-bearing shell and a cover element for contact with a user, characterized in that the shell comprises at least one first base element made from a composite material composed of a synthetic polymeric matrix and a natural fiber-containing reinforcement.

As used herein, the term "composite material" and derivatives thereof shall be meant to indicate a material comprising a thermoplastic or thermosetting polymeric matrix with a fibrous reinforcement embedded therein.

As used herein the term "natural fibers" and derivatives thereof shall be meant to indicate fibers of animal or plant origin.

In another aspect, the invention relates to a process for making the above seating structure.

Advantageous embodiments of the invention are defined in accordance with the independent claims.

BRIEF DESCRIPTION OF DRAWINGS

Further features and advantages of the invention will be more apparent from the detailed description of a preferred, non-exclusive embodiment of a seating structure according to the invention, which is described by way of a non-limiting example with the help of the annexed drawings, in which.

DETAILED DESCRIPTION OF PREFERRED EMBODIMENTS

Figure 1:
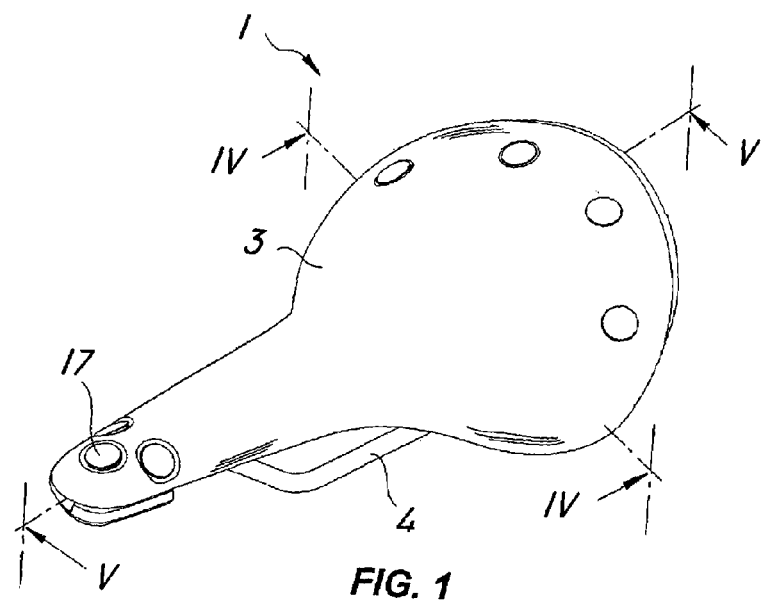
FIG. 1 is an axonometric view of a seating structure of the invention.

Referring to the above figures, the seating structure of the invention, generally designated by numeral 1, is embodied herein by a bicycle saddle having an elongate front portion and a widened rear portion for supporting a user. Nonetheless, it will be understood that the seating structure 1 may be configured as a seat, a seating surface of a chair or any other human body support.

The structure 1 is essentially comprised of a load-bearing shell 2 and a cover element 3 thereon, for contact with a user. The seat 1 may further comprise rails 4 or the like for connection to a bicycle frame, not shown but well known per se.

According to the invention, the shell 2 comprises at least one first base element 5 made from a composite material composed of a thermoplastic or thermosetting synthetic polymeric matrix and a reinforcement containing natural fibers, such as wool, cotton, linen, jute fibers.

Thanks to this particular arrangement, the seating structure of the invention has a lower environmental impact as compared to prior art saddles. Indeed, the natural fiber-containing composite material is much more easily recyclable than traditional composite materials.

Furthermore, many users find the natural fiber-containing composite material comfortable and pleasant to the touch.

Unless otherwise stated, the technical characteristics of the base element 5 as mentioned below shall be generally intended to designate from time to time one or more of the base elements 5, 5', . . . of the shell 2.

Also, the natural fibers may be of the woven and/or non-woven type and may be combined with polymeric and/or synthetic and/or metal fibers for reinforcing the base element 5. For this purpose, the composite material of the latter may be also filled with nanoparticles, that can be of metal and/or mineral and/or polymeric types.

In a preferred configuration, the synthetic polymeric matrix of the composite material that forms the base element 5 is of thermoplastic type, preferably in fiber form at ambient temperature. Such fibers may be selected, for example, from the group comprising: polypropylene, polyamide, polybutadiene terephthalate, polyethylene, polystyrene. Nevertheless, it shall be understood that the polymeric matrix may be provided in other states, e.g. in granules, without departure from the inventive scope as defined in the annexed claims.

Advantageously, the shell 2 may include at least one substantially sheet-like stiffening element, preferably made of metal, laid on the base element 5 to improve the mechanical properties of the shell 2.

Nevertheless, it shall be understood that the shell 2 of the saddle 1 may also consist of the first base element 5 only, without departure from the inventive scope as defined in the annexed claims. It shall be further understood that the stiffening element 6 may be formed of any material, such as a traditional composite, i.e. carbon fiber, glass, Kevlar® or the like, without departure from the inventive scope as defined in the annexed claims.

Suitably, the base element 5 may include at least one differential deformable portion, generally designated by numeral 7. This will make the saddle comfortable and practical even for the most demanding users. As particularly shown in FIGS. 4 and 5, the saddle will have stiffer areas, designated by numerals 8, 8', which will contribute to the increase of its mechanical strength, and more resilient areas, defined by the differential deformable portions 7, for improved user comfort.

As used herein, the term "differential deformable portion" or the like shall be meant to indicate an area within the surface of the seat 1 that, under a load, has a considerably lower deformability than at least another area within the same surface under the same load.

Preferably, the differential deformable portion 7 may be located in the ischial and/or prostatic and/or peripheral zones of the saddle, thereby defining high user comfort areas in the regions of the body that are more susceptible to injury and pain during exercise. Particularly, one or more differential deformable portions 7 may be provided at the contact points between the seat 1 and the inner thigh of a user.

Advantageously, the stiffening element 6 may have at least one aperture 9 coincident with the more deformable portions 7, to allow contact of the user with the more comfortable areas.

Figure 3:
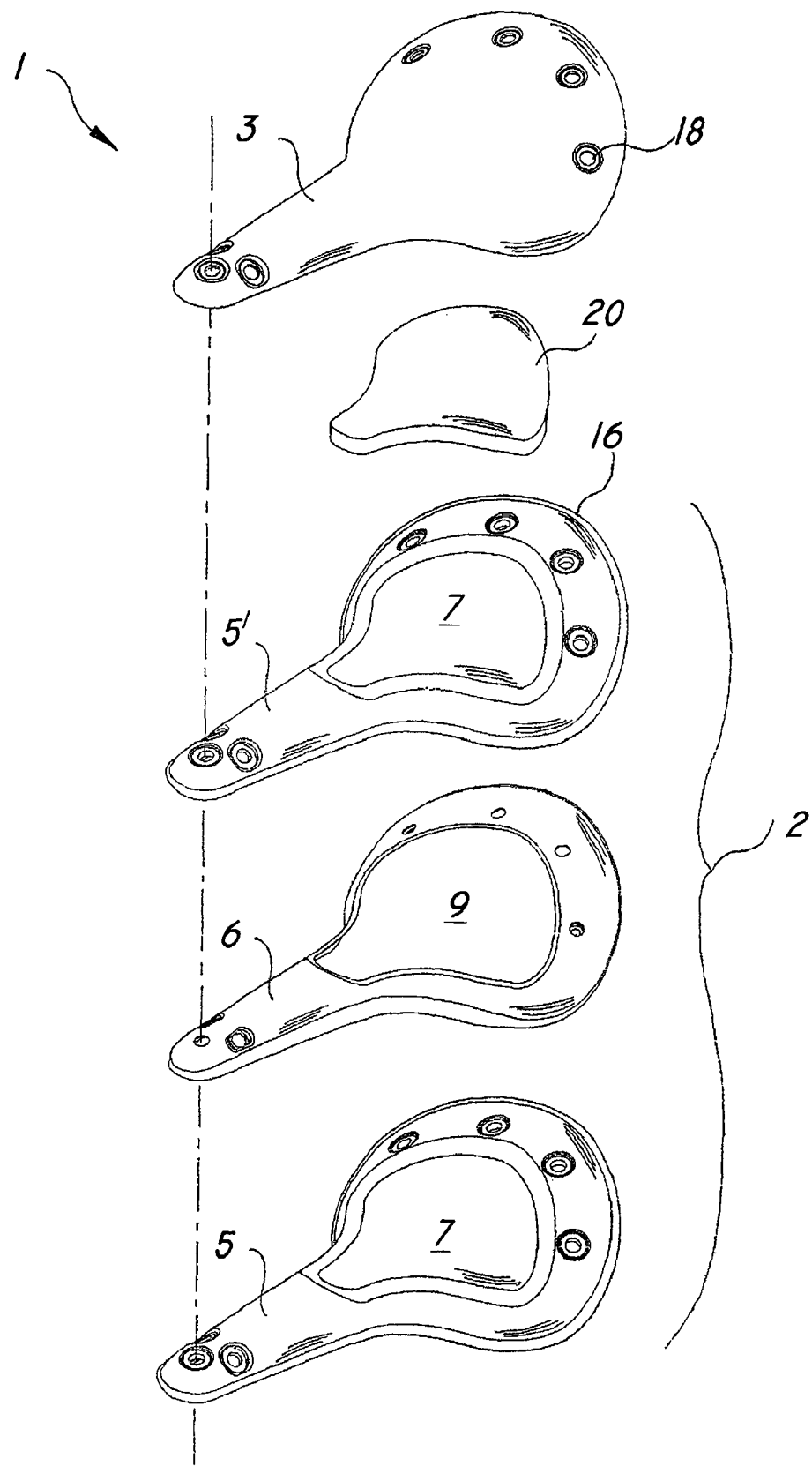
FIG. 3 is an exploded view of the structure of FIG. 1 according to an alternative embodiment.

For further improvement of user comfort, at least one insert 20 of a viscoelastic material or the like, preferably a polyurethane elastomer and/or gel, may be interposed between the cover element 3 and the shell 2, as shown in FIG. 3 and attached thereto.

The base element 5 may be formed by thermoforming at least one sheet element 10 from the composite material consisting of the synthetic polymeric matrix and the natural fiber-containing reinforcement in a specially designed mold 11. As a non limiting example, a sheet element 10 may be used that is formed of jute fibers dispersed in a polypropylene fiber matrix.

In a preferred embodiment, the sheet element 10 may be laid in the mold 11, compressed between the male and female parts 12, 13 thereof and heated to a temperature near the melting or setting temperature of the matrix of the composite material, depending on whether such matrix is of the thermoplastic or thermosetting type. As an indication, such temperature may be in a range from 150° C. to 300° C., according to the type of matrix being used.

During the thermoforming step, the sheet element 10 changes from its initial height H1 to a final height H2 defined by the distance between the male and female parts 12, 13 of the mold 11. It will be understood that the ratio between the heights H1/H2 will determine the compression ratio of the sheet element 10 so that, as the H1/H2 compression ratio increases the base element 5 will have an increasing stiffness.

The differential deformable portions 7 of the base element 5 may be obtained by differential compression of the base element 5 between the male and female parts 12, 13 of the mold 11, to create areas with different compression ratios.

Figure 6:
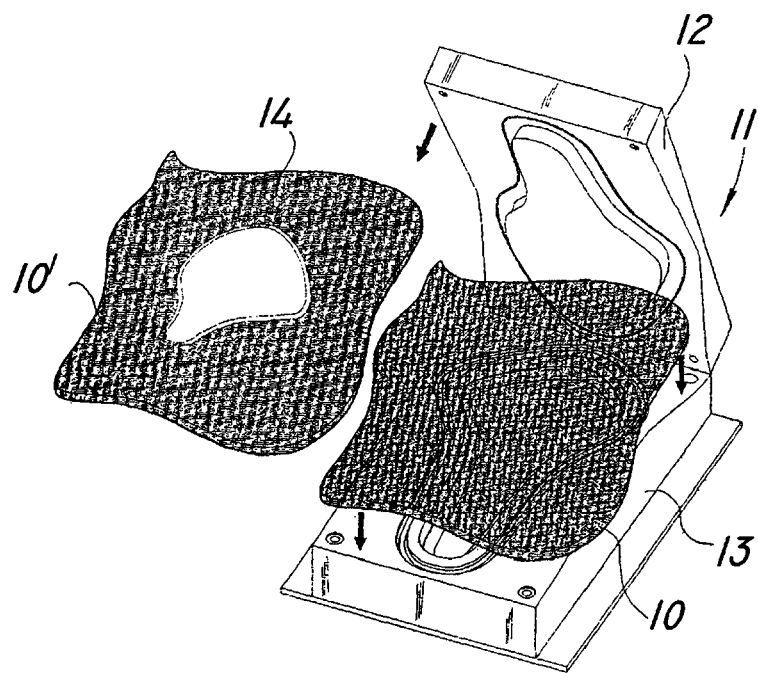
FIG. 6 is an axonometric view of a step of the process for making the base element 5 of the seating structure of the invention.
Figure 7:
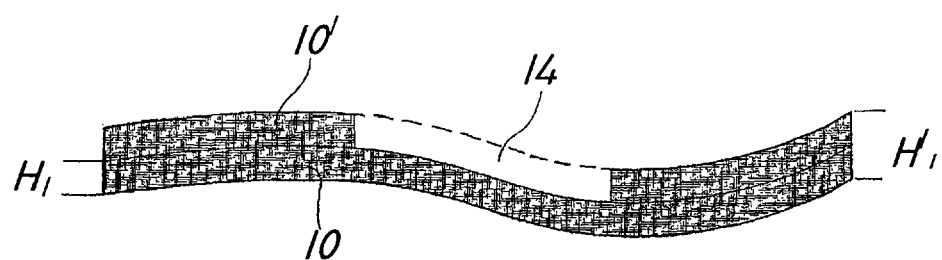
FIG. 7 is a sectional view of a few details of FIG. 6.
Figure 8:
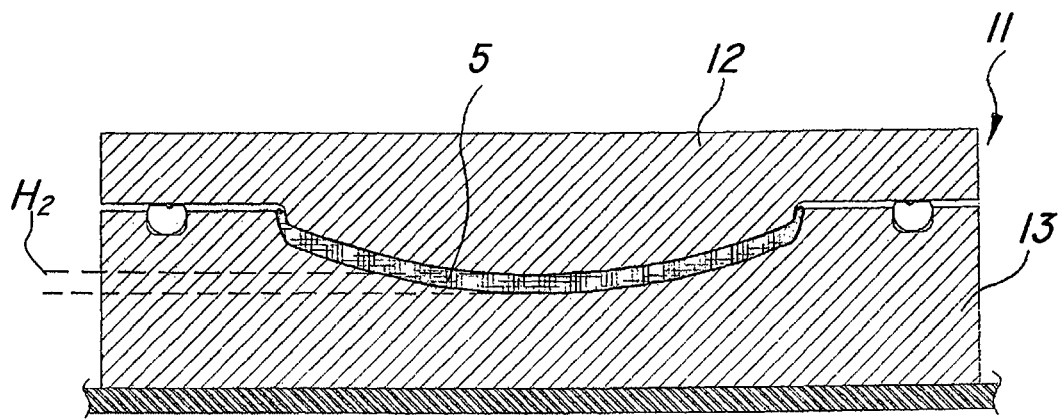
FIG. 8 is a sectional view of a mold as taken during another step of the process for making the base element 5 of the seating structure of the invention.

For example, as shown in FIGS. 6 to 8, at least one layer 10' may be laid on the sheet element 10, preferably made of the same composite material as the sheet element 10, and having at least one aperture coincident with the area designed to define the more deformable portion 7.

Thus, the assembly formed by the sheet element 10 and the layer 10', generally designated by numeral 15, will have differential initial heights, which are designated by H1 at the aperture 14 (defined by the height of the sheet element 10 only) and by H1' at the areas at the periphery of the aperture 14. As particularly shown in FIG. 7, the height H1' is greater than the height H1.

Once the base element 5 has been formed in the mold 11, in which the male and female parts 12, 13 are, as mentioned above, at a distance H2, it will have an area at the aperture 14, corresponding to the differential deformable portion 7, in which the compression ratio is H1/H2 and areas at the periphery of the aperture 14, corresponding to the stiffer areas 8, 8', in which the compression ratio is H1'/H2.

Figure 2:
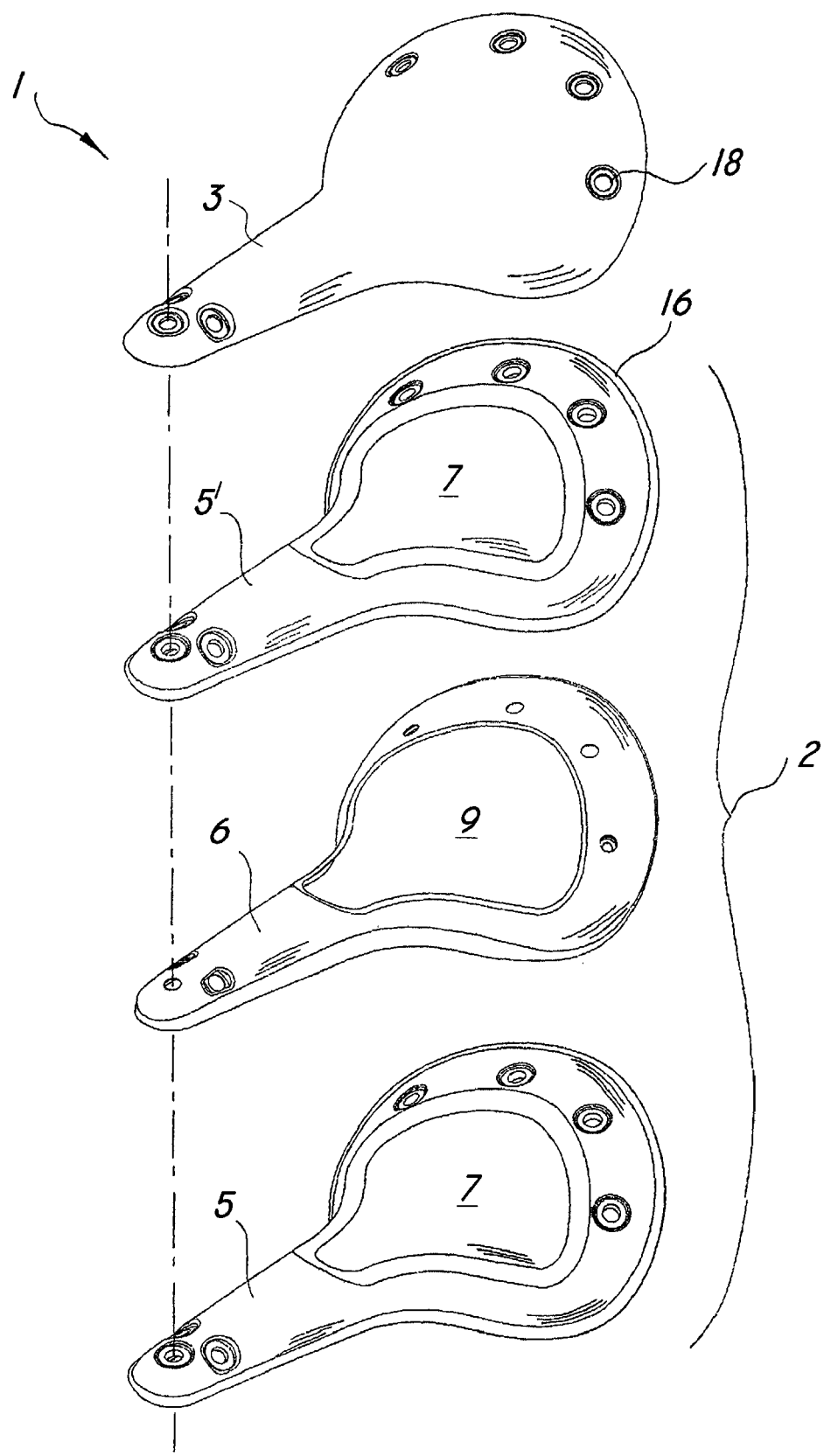
FIG. 2 is an exploded view of the structure of FIG. 1.

FIG. 2 shows a preferred, non exclusive embodiment of the seating structure of the invention, in which the shell 2 has first and second base elements 5, 5' of a composite material composed of the synthetic polymeric matrix and the natural fiber-containing reinforcement as described above, with the metal stiffening element 6 interposed therebetween. The second upper base element 5' has a cover element 3 attached thereto, which is preferably made of leather, skin or the like. For this purpose, the latter has a peripheral edge 16 which defines an abutment for the cover element 3, as particularly shown in FIG. 5.

FIG. 3 shows another preferred, non exclusive embodiment of the invention, which is similar to the former except that a viscoelastic insert 20 is coincident with the differential deformed portion 7. The insert may be attached to the base element 5 in a known manner.

In both embodiments additional means may be provided for attachment of the cover element 3 to the shell 2 and/or of the various layers of the shell 2 to each other, such as nuts or rivets 17 to be introduced in respective through holes 18.

The seating structure as shown in FIGS. 2 and 3 may be fabricated using a process that includes the following steps.

First, the first and second base elements 5, 5' shall undergo preventive thermoforming, by following the steps as shown in FIGS. 6 to 8. It shall be understood that at least one sheet element 10 has to be thermoformed for each base element 5, 5'.

Advantageously, a composite material including a thermoplastic matrix will be used, for reasons that will appear more clearly hereinbelow.

Preferably, the pre-thermoforming steps on the first and second base elements 5, 5' will be carried out at a temperature slightly below the softening point of the thermoplastic matrix of the composite material that forms the sheet elements 10, so that it can be formed with a shape that allows further shaping and handling of the layers 5, 5', without being the final shape.

After such pre-thermoforming step, the first and second base elements 5, 5' and the stiffening element 6 interposed therebetween and possibly the insert 20 are laid in the mold in the order as shown from top to bottom in FIGS. 2 and 3. The cover element 3 may be attached to the upper base element 5' directly in the same mold or after this step.

For instance, in the embodiment as shown in FIG. 2, the cover element 3 may be glued to the shell 2 after thermoforming thereof. On the other hand, in the embodiment of FIG. 3, the cover element 3 may be first introduced in the mold, followed by the viscoelastic material that is designed to form the insert 20 and then, in the following order, by the second base element 5', the stiffening element 6 and the first base element 5.

Figure 4:
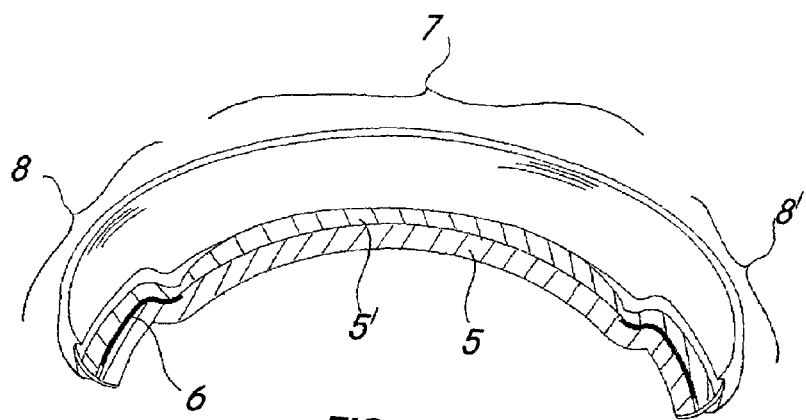
FIG. 4 is a sectional view of the structure of FIG. 1, as taken along a plane IV-IV.
Figure 5:
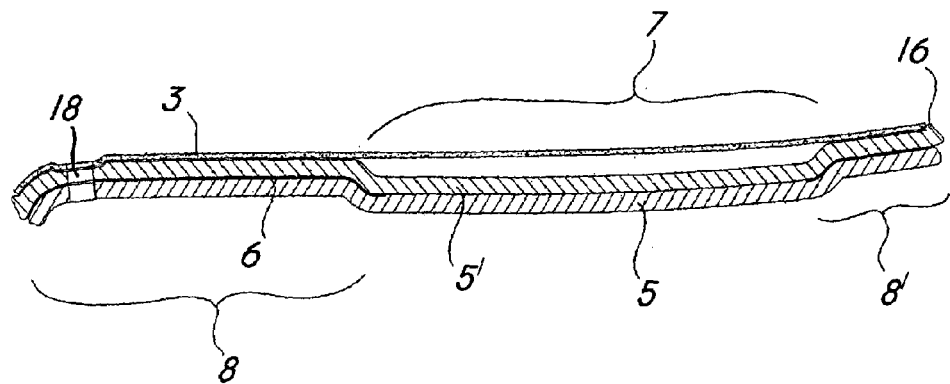
FIG. 5 is a sectional view of the structure of FIG. 1, as taken along a plane V-V.

Now, in any case, the mold 11 is heated to a temperature near or above the melting temperature of the thermoplastic fibers of the composite material, for the stiffening element 6 to be safely embedded between the first and second base elements 5, 5'. Furthermore, during this step, the thermoplastic matrix of the composite material that forms these elements melts and forms a substantially continuous structure at the points in which the first and second base elements 5, 5' are not separated by the stiffening element 6, as shown in FIGS. 4 and 5.

The provision of a stiffening element 6 embedded between the first and second base elements 5, 5' imparts excellent mechanical properties to the shell 2.

The above disclosure clearly shows that the seating structure of the invention fulfills the intended purposes and particularly meets the requirement of providing a seating structure that has a relatively low environmental impact.

The structure and process of the invention are susceptible to a number of changes and variants, within the inventive concept disclosed in the annexed claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention claimed is:

1. A seating structure, comprising a load-bearing shell and a cover element designed to contact a user, said shell comprising at least one first base element made from a composite material composed of a polymeric matrix and a fiber-containing reinforcement, wherein said polymeric matrix is synthetic and said fibers of said reinforcement are natural fibers, wherein said shell comprises at least one substantially sheet-like stiffening element attached to said at least one first base element, wherein the seating structure comprises at least one second base element, said at least one stiffening element having a peripheral edge substantially recessed relative to said at least one first and at least one second base elements and being evenly embedded therebetween.

2. Seating structure as claimed in claim 1, wherein said synthetic polymeric material is of thermoplastic type.

3. Seating structure as claimed in claim 2, wherein said synthetic thermoplastic polymeric material is in fiber form at ambient temperature.

4. Seating structure as claimed in claim 3, wherein synthetic thermoplastic polymeric fibers are selected from the group comprising: polypropylene, polyamide, polybutadiene terephthalate, polystyrene, polyethylene.

5. Seating structure as claimed in claim 1, wherein said natural fibers are selected in the group comprising wool, cotton, linen, jute.

6. Seating structure as claimed in claim 1, wherein said composite material is filled with nanoparticles.

7. Seating structure as claimed in claim 1, wherein said at least one of stiffening element is in direct contact with said at least one first base element.

8. Seating structure as claimed in claim 1, wherein said at least one first base element includes at least one differential deformable portion.

9. Seating structure as claimed in claim 8, wherein said at least one differential deformable portion is located in the ischial and/or prostatic and/or peripheral zone of the seat.

10. Seating structure as claimed in claim 9, wherein at least one reinforcement sheet element has a plan shape similar to that of said at least one first base element and has at least one aperture coincident with said at least one differential deformable portion.

11. Seating structure as claimed in claim 1, wherein the seating structure comprises at least one insert made of material with a viscoelastic behavior, laid on said at least one first base element.

12. Seating structure as claimed in claim 11, wherein said viscoelastic material of said at least one insert is a polyurethane gel.

13. Seating structure as claimed in claim 11, wherein said insert made of viscoelastic material is located coincident with at least one differential deformable portion.

14. A process for making a seating structure as claimed in claim 1, wherein said at least one base element is obtained by thermoforming a polymeric matrix with reinforcement fibers embedded therein in a mold, wherein said polymeric material is selected from synthetic polymeric matrices and said reinforcement fibers are selected from natural reinforcement fibers.

15. Process as claimed in claim 14, wherein said at least one first base element is obtained by thermoforming, in said mold, at least one sheet element formed of said synthetic polymeric matrix with said natural fibers embedded therein.

16. Process as claimed in claim 15, wherein said thermoforming is carried out by laying said at least one first sheet element in said at least one first base element and heating the at least one first sheet element and the at least one first base element to a temperature near the melting temperature of said synthetic polymeric matrix.

17. Process as claimed in claim 16, wherein said at least one base element is obtained by providing an assembly formed of at least one first sheet element and at least one second sheet element substantially similar to the former and having at least one aperture coincident with the ischial, prostatic or peripheral zone of the seat and by compressing said assembly in said mold to impart substantially uniform thickness thereto, with at least one differential deformable portion at said at least one aperture.

18. Process as claimed in claim 15, wherein the process provides thermoforming of said first and second base elements mutually coupled with said at least one stiffening element interposed therebetween.

* * * * *